Nov. 10, 1925.  1,560,706
W. C. MAZE
BUMPER FOR MOTOR CARS
Filed Feb. 10, 1925
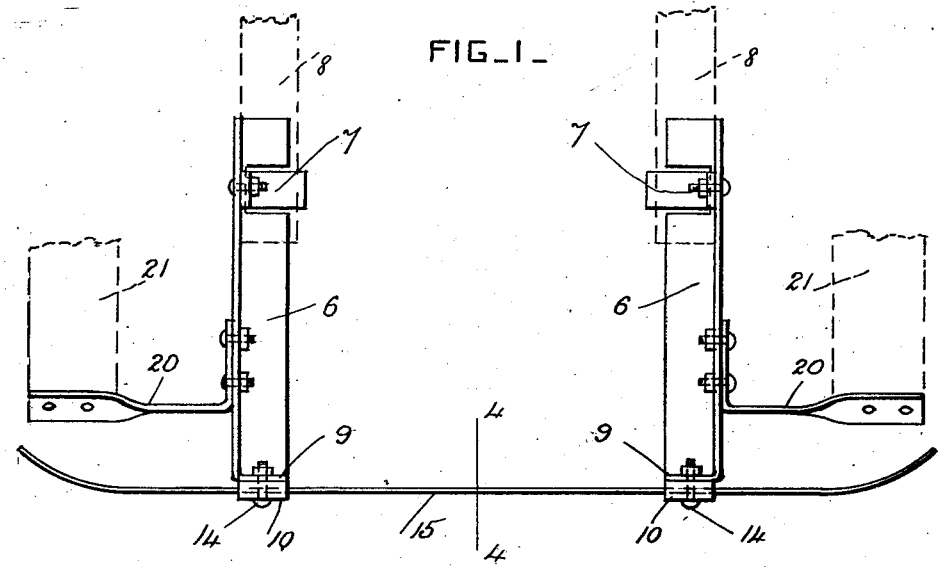
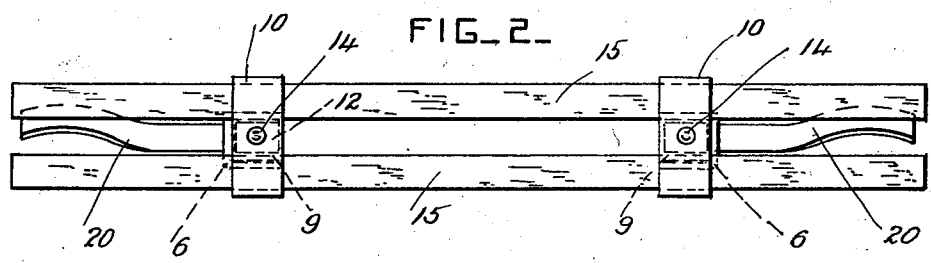
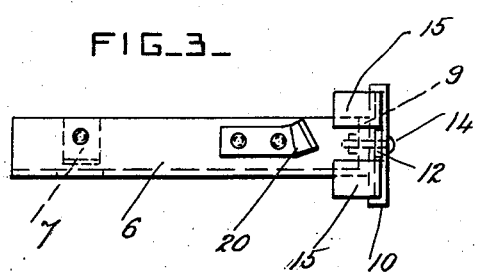
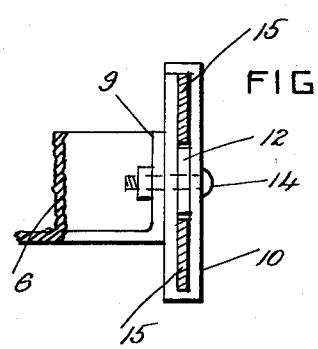
Inventor.
Wyeth C. Maze Patented Nov. 10, 1925.

1,560,706

UNITED STATES PATENT OFFICE.

WYETH C. MAZE, OF WICHITA, KANSAS.

BUMPER FOR MOTOR CARS.

Application filed February 10, 1925. Serial No. 8,255.

*To all whom it may concern:*

Be it known that I, WYETH C. MAZE, a citizen of the United States, residing at Wichita, in the county of Sedgwick and State of Kansas, have invented certain new and useful Improvements in Bumpers for Motor Cars, of which the following is a specification.

This invention relates to bumpers for motor cars, and more particularly to bumpers adapted to be secured to the rear ends of the cars and having braces for the wheel fenders combined with them; and it consists in the novel construction and combination of the parts hereinafter fully described and claimed.

In the drawings, Figure 1 is a plan view of a bumper constructed according to this invention. Fig. 2 is a front elevation of the same. Fig. 3 is a side view of the bumper. Fig. 4 is a cross-section through the spring bars, taken on the line 4—4 in Fig. 1.

Two straight supporting beams 6 are provided. These beams are angle-shaped in cross-section, and are arranged parallel to each other. The beams are straight from end to end, and they are formed of iron which is stiff and strong. They are not resilient springs, or made of steel. At one end these beams are provided with any suitable bolts or clamping devices 7 for securing them to the frame 8 of the motor car, a portion of which is shown in dotted lines. At the other end the beams 6 have end plates or flanges 9 forged on them and arranged crosswise of their main portions. Two similar loops 10 are provided, and have washers 12 at their middle parts. Bolts 14 are arranged in holes in the loops, washers and end plates 9, and secure the loops to the beams.

Horizontal bars 15 of spring steel are securely clamped by the bolts 14 in the upper and lower end portions of the loops 10. These bars are made of light spring steel, and their end portions are preferably curved a little, and they are relied on to receive the impact of any body which comes in contact with the bumper.

The beams are not spring beams, and they merely hold the spring bumper bars in place. Braces 20 are secured at one end to the sides of the beams between their ends, and at their other ends to the wheel fenders 21, portions of which are shown in dotted lines. These braces are curved and twisted to suit the various makes of cars and their differently positioned wheel fenders. The braces can only be secured satisfactorily in this way when the beams are not springs which are sprung out of position or shape when the bumper strikes an object. The iron beams do not break as easily as the supports of spring steel ordinarily used, and they can be furnished and attached to motor cars with very little cost and expense.

What I claim is:

1. A bumper for a motor car, comprising two stiff beams angle-shaped in cross-section and provided at one end with means for securing them to a car frame, said means having end plates at their other ends arranged crosswise of them, and horizontal spring bumper bars secured to the said end plates.

2. A bumper for a motor car, comprising two stiff beams angle-shaped in cross-section and provided at one end with means for securing them to a car frame, said beams being arranged parallel to each other and having end plates at their other ends arranged crosswise of their main portions, loops having their middle parts secured to the end plates, and horizontal spring bumper bars clamped in the upper and lower end portions of the said loops.

In testimony whereof I have affixed my signature.

WYETH C. MAZE.